INVENTORS
ALEXANDER H. BOHR
WALTER O. BORCHERDT
BY
THEIR AGENT

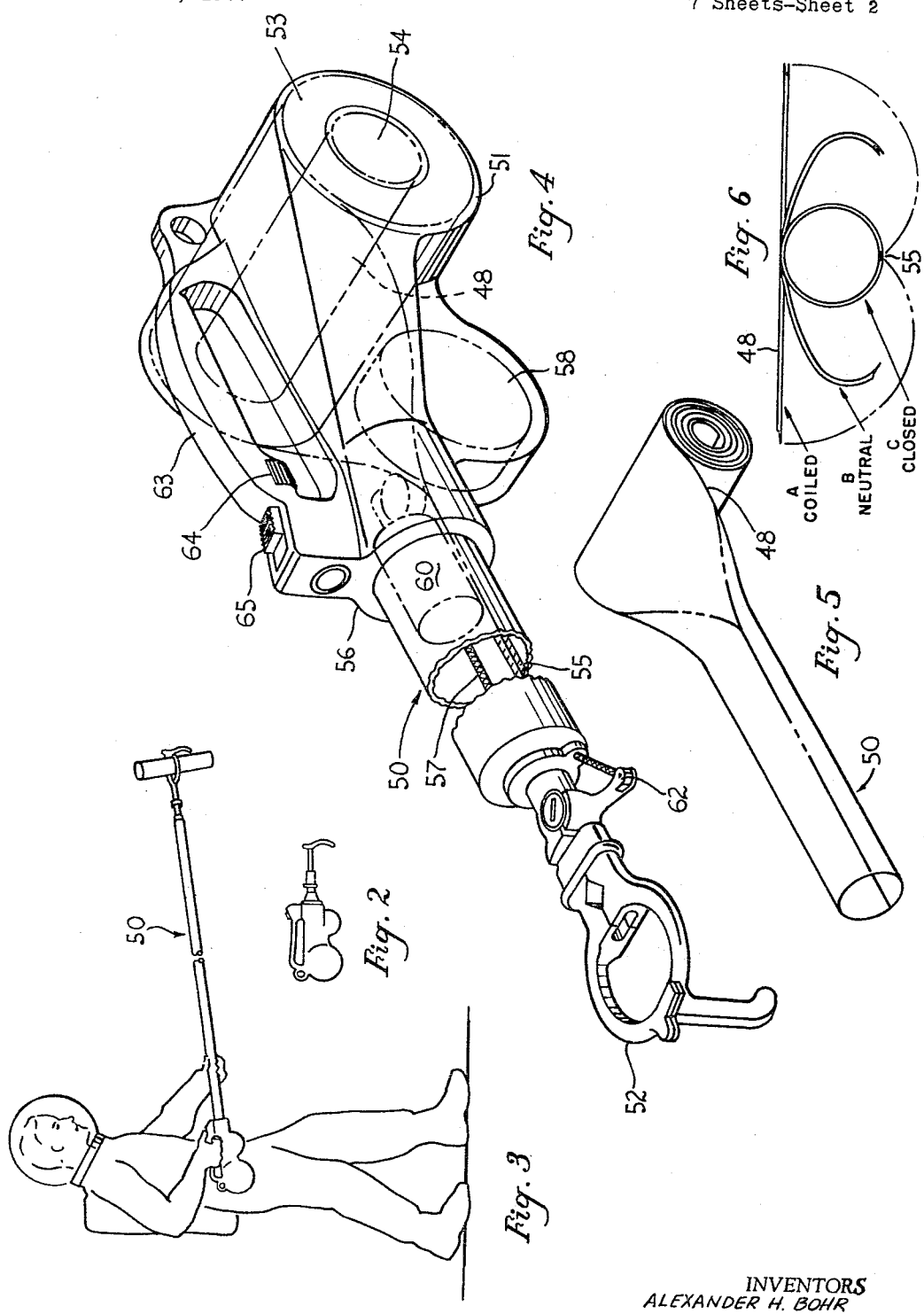

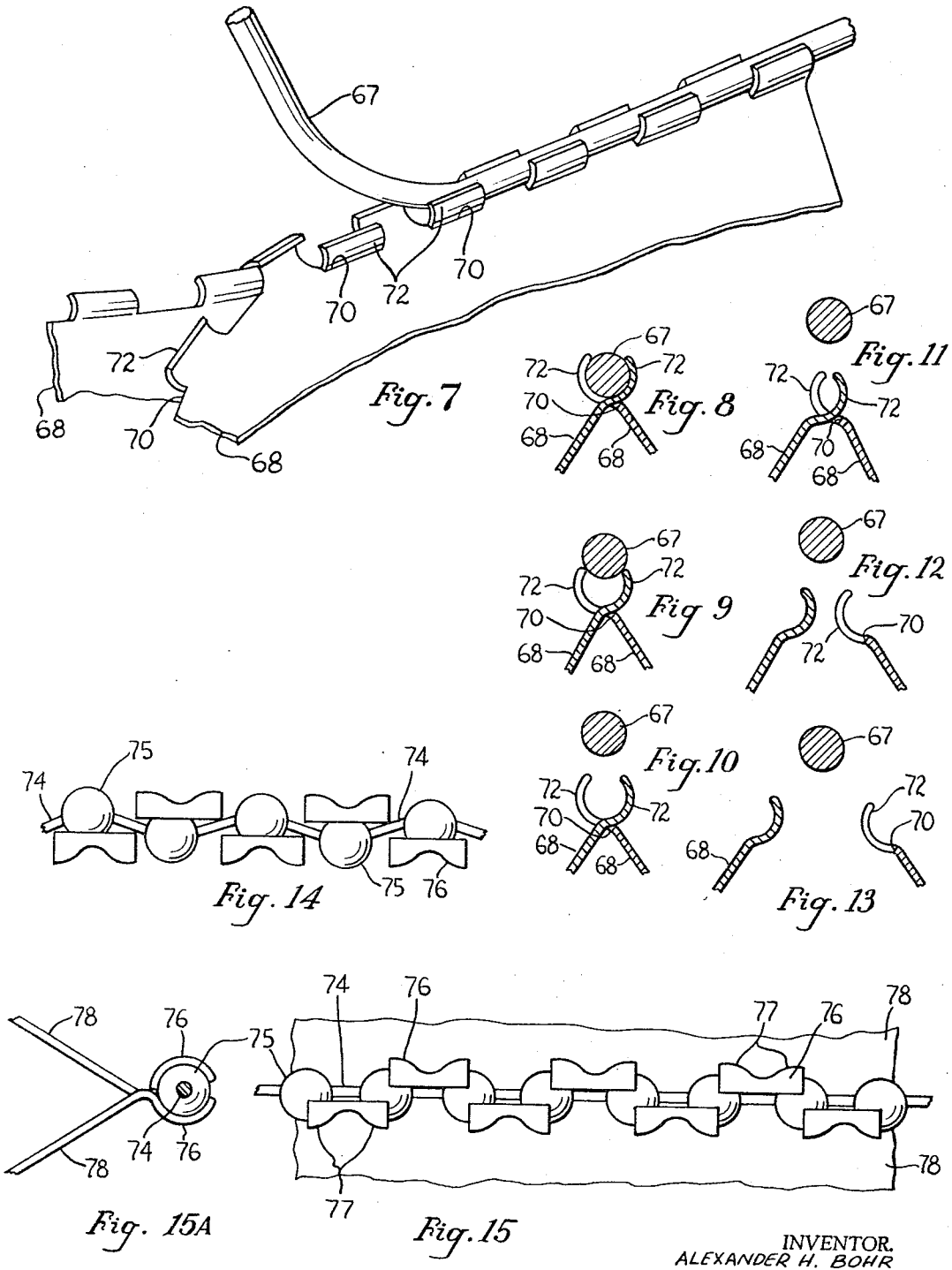

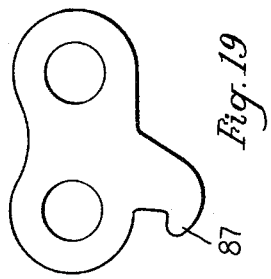
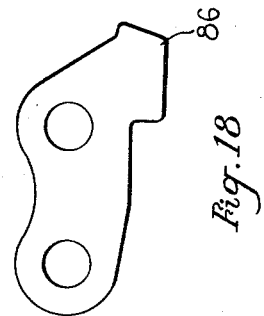
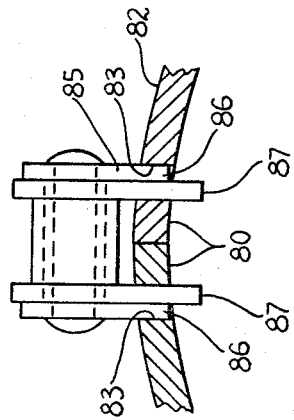
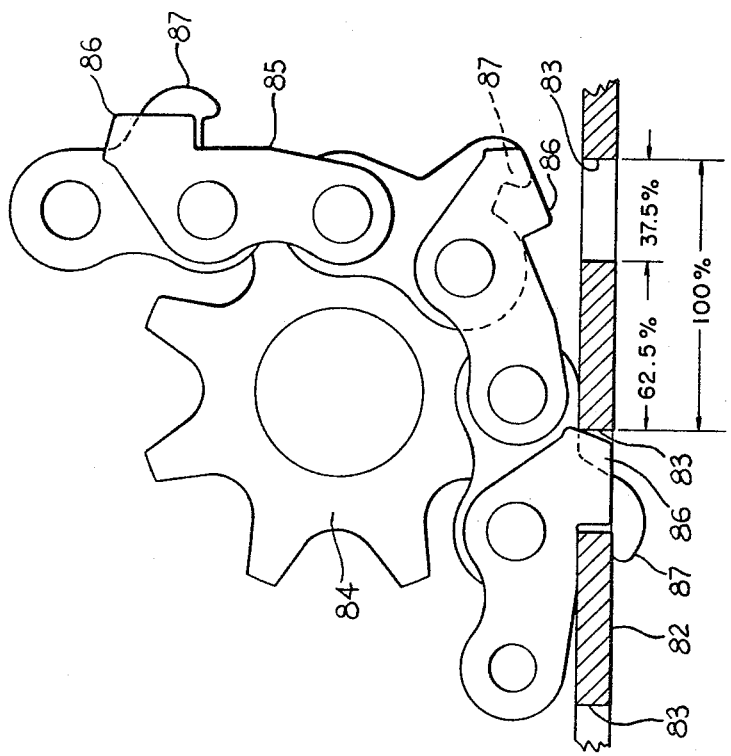

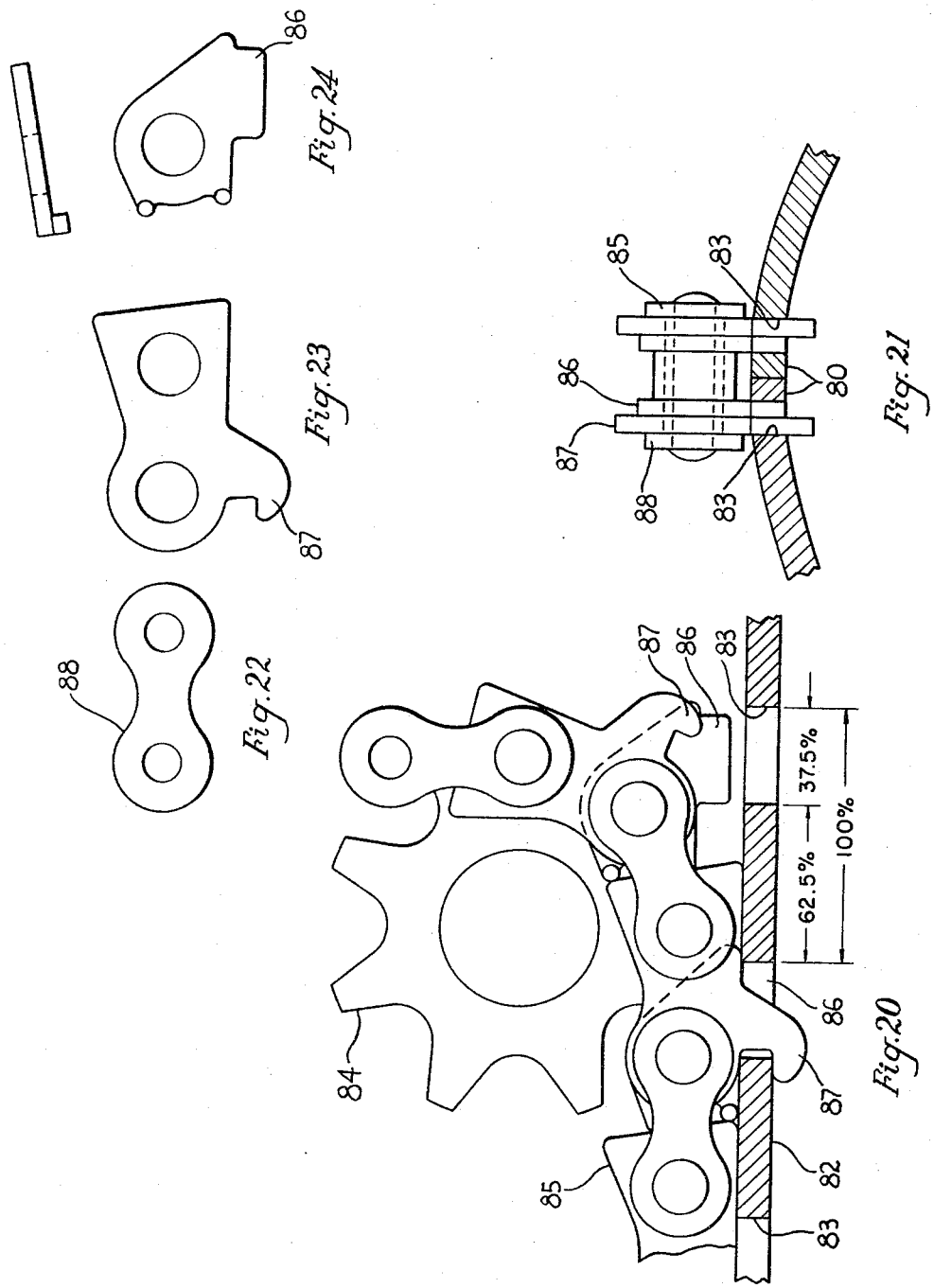

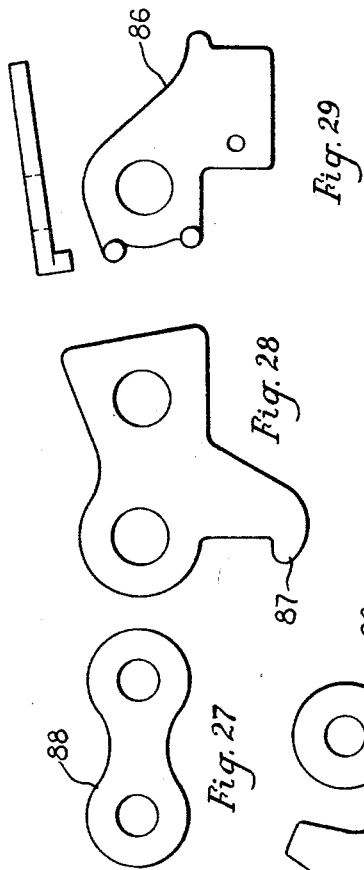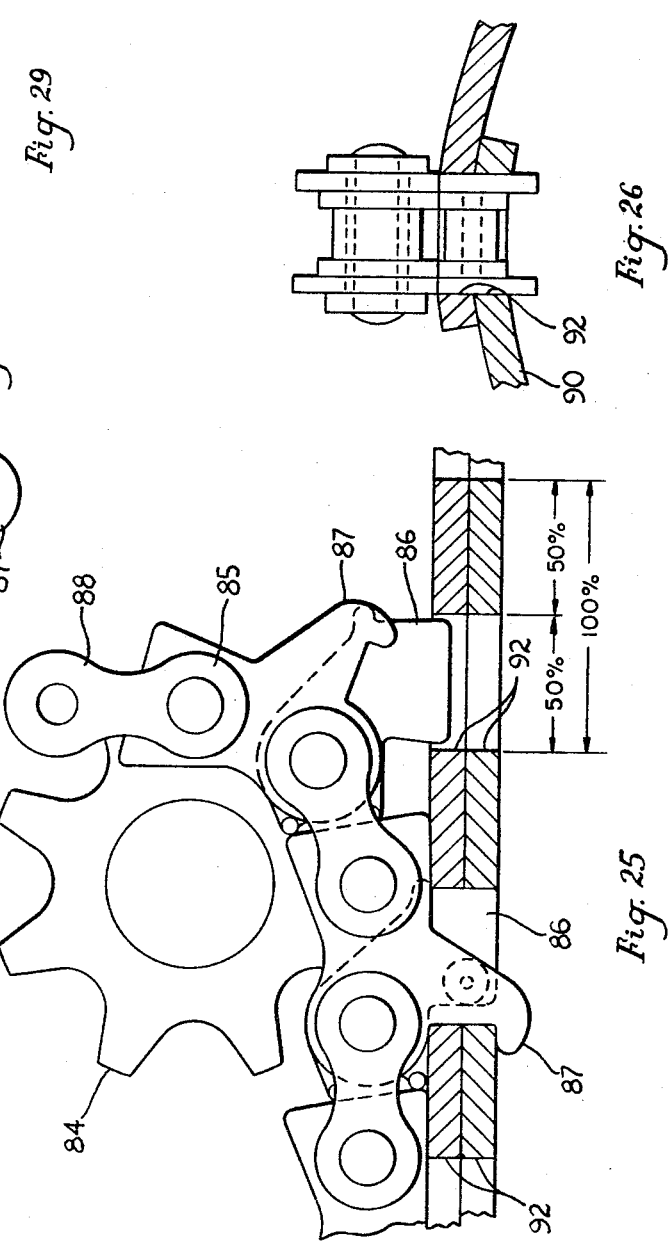

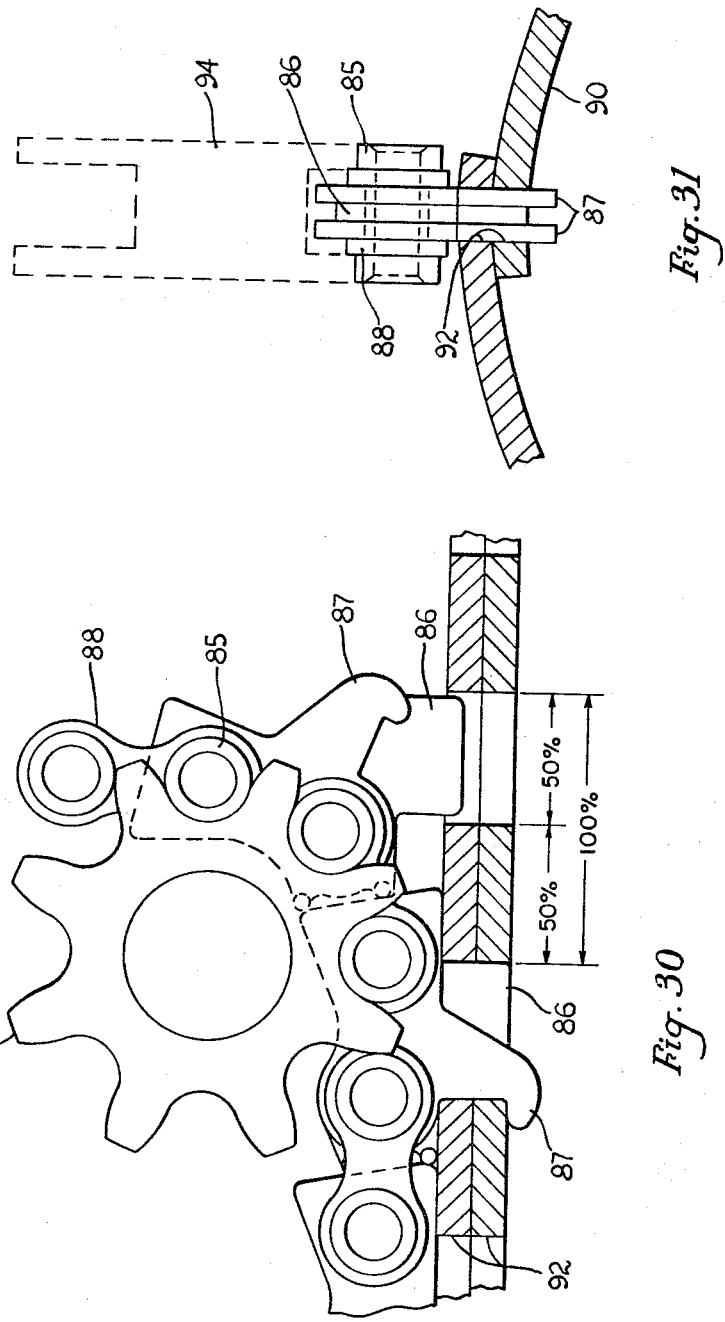

United States Patent Office 3,319,987
Patented May 16, 1967

3,319,987
EXTENSIBLE BOOM
Alexander H. Bohr, Sparta, and Walter O. Borcherdt, Mountain Lakes, N.J., assignors to Thiokol Chemical Corporation, Bristol, Pa., a corporation of Delaware
Filed Oct. 19, 1965, Ser. No. 497,909
11 Claims. (Cl. 294—19)

This invention relates generally to extensible booms and more particularly to a compactly storable and transportable, hollow boom formed from coiled strips which are extensible in the field to form triangular, rectangular, circular or other useful construction shapes to perform useful functions.

An extensible hollow boom of this general nature which is formed from coiled strips is disclosed in my copending application Ser. No. 209,357, now Patent No. 3,213,573, filed July 12, 1962, and has many and varied applications such as foot and vehicle bridges, hoists, portable lifts, elevators, antennae towers, manipulators, grapnels, ladders, truck body stakes, etc.

The main object of the present invention is to provide an improved hollow extensible boom for use in varied applications which may be formed from separately stored strips of material which are readily extensible and connectible in the field to form strong rigid structures of variable lengths.

An important object of the present invention is to provide an extensible tension-web beam which may be formed from specially fabricated separately stored, coiled strips of material which are readily extensible and connectible in the field to form a long span and sustain large bending loads.

Another important object of the present invention is to provide an improved hollow extensible boom of the type described which may be readily carried by hand and extended or retracted under manual control to perform useful functions.

A further important object of the present invention is to provide an improved hollow extensible boom which may be formed from a stored coiled strip which is extensible in the field to form a strong rigid structure.

A still further important object of the present invention is to provide improved means for connecting the edges of the stored coiled strips as they are extended to insure rigidity of the boom, beam, etc. being formed by such extension, and for disconnecting the edges during retraction of the boom to the coiled strip storage position.

Other objects and advantages of the present invention will become apparent during the course of the following description.

In the drawings we have shown several embodiments of the invention. In these showings:

FIGURE 2 is a side elevation view to a smaller scale of a portable extensible boom in retracted position;

FIGURE 3 is a similar view thereof showing it held by an operator and in extended position;

FIGURE 4 is a perspective view thereof to an enlarged scale illustrating the details of its construction;

FIGURE 5 is a perspective view of the single coiled strip from which the portable boom or manipulator is formed upon its extension and the initial formation thereof;

FIGURE 6 is a transverse diagrammatic view of the strip showing its stored position, natural or unstressed shape, and its connected position to form a boom;

FIGURE 7 is a perspective view of the use of a wire or cable to connect one form of the edges of the strips employed to form a boom, etc.;

FIGURE 8–13 are diagrammatic views illustrating the manner of withdrawal of the locking wire or cable of FIGURE 7 during retraction of the boom;

FIGURE 14 is a diagrammatic view of a modified form of strip edge connecting means in initial position;

FIGURE 15 is a similar view showing the bead chain of FIGURE 14 in operative or strip connected position;

FIGURE 15A is a diagrammatic end view thereof;

FIGURE 16 is a fragmentary, longitudinal sectional view of another embodiment of strip edge connecting means wherein the edges are in abutting relationship;

FIGURE 17 is a fragmentary transverse sectional view thereof;

FIGURES 18 and 19 are elevational views of the connecting chain links of FIGURES 16 and 17;

FIGURE 20 is a fragmentary, longitudinal, sectional view of a further embodiment of strip edge connecting means for abutting strip edges;

FIGURE 21 is a fragmentary transverse sectional view thereof;

FIGURES 22 to 24 are elevational views of the connecting chain links of FIGURES 20 and 21;

FIGURE 25 is a fragmentary, longitudinal, sectional view of another embodiment of strip edge connecting means which is similar to that of FIGURES 20-24 but applied to lap joint edges;

FIGURE 26 is a fragmentary, transverse sectional view thereof;

FIGURES 27 to 29 are elevational views of the connecting chain links of FIGURES 25 and 26;

FIGURE 30 is a fragmentary, longitudinal, sectional view of another embodiment of strip edge connecting means which is similar to that of FIGURES 25-29 but employs an external rather than internal chain engaging sprocket; and FIGURE 31 is a fragmentary, transverse, sectional view thereof.

Figure 1:
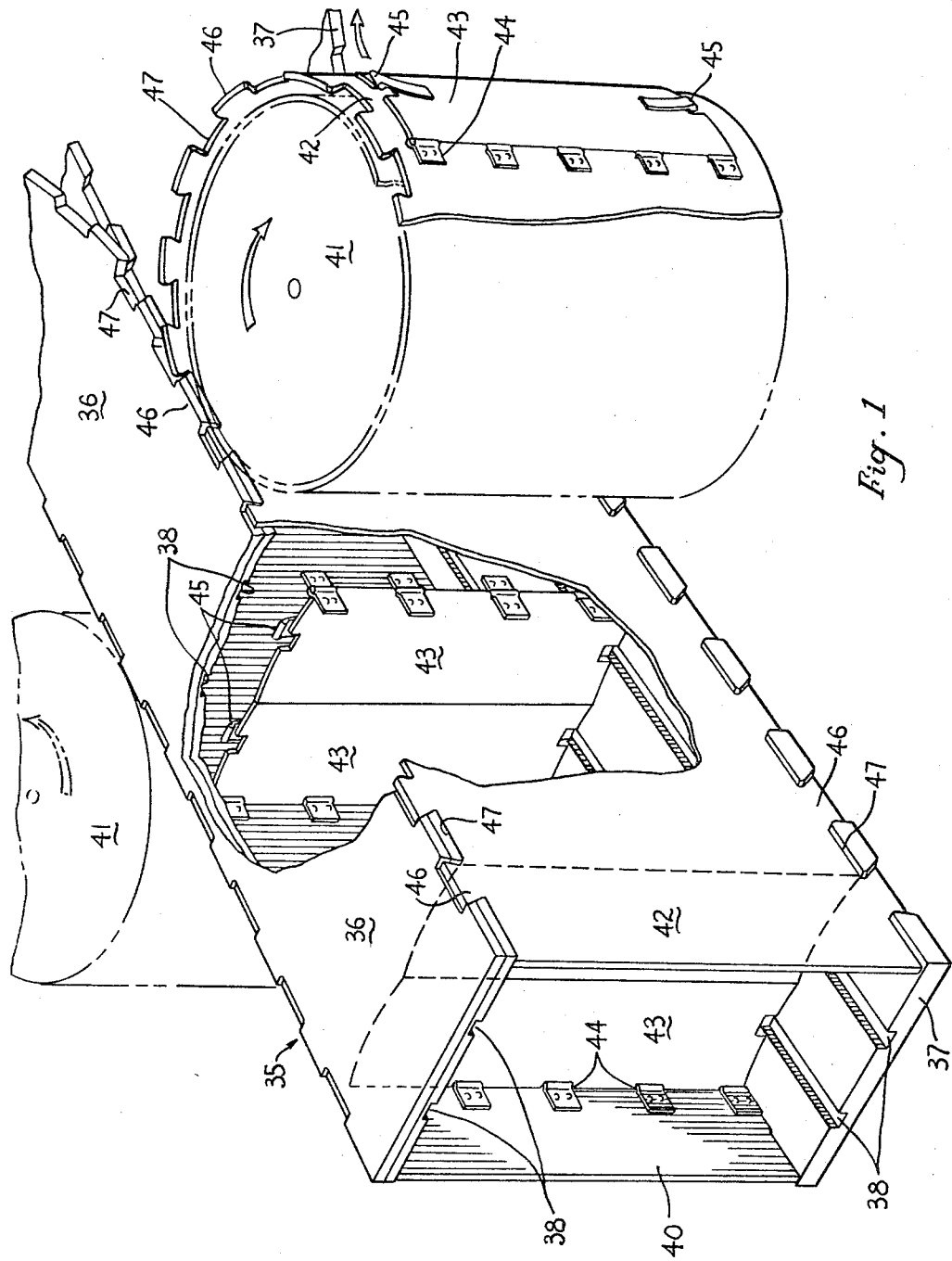
FIGURE 1 is a perspective view illustrating the forming of a tension-web beam from specially fabricated strips passed to boom forming rolls from separately stored, coils thereof.

Referring to FIGURE 1 of the drawings, numeral 35 designates as a whole, the novel tension-web beam being formed by the extension (and connection) of strips unwound from separate coiled, storage positions (not shown) The tension-web beam principle is well known in the art, has found a particularly useful application in aircraft wing spar construction, and the present invention extends its sphere of utility.

Basically, the tension-web beam utilizes a top plate and a bottom plate which respectively take the compressive and tensile stresses to which the beam is subjected. The plates are separated by a spaced series of panels or columns which afford torsional stiffness to the beam and a thin web is attached between the edges of the plates to carry tensile stresses. When the beam is loaded, it deflects because the top and bottom plates and columns, being of rectangular section, do not offer high bending resistance. However, as the beam deflect, the plates tend to bend and try to shear the tension-webs. These wrinkle and take up the load in tension. Stress-wise, the effect is as if the webs comprised a large group of parallel, diagonal struts acting as truss supports to thus sustain the load.

As formed by the specially fabricated strips of the present invention, the tension-web beam 35 of the present invention comprises strips extended from storage rolls (not shown) to form a 2-ply laminated top plate 36, a bottom plate 37—each having longitudinally extending locking grooves 38, and side tension webs 40, 42, which are stored on side reels 41, each of which is provided with one half of a spaced series of plate support columns 43 hinged thereto as at 44 and including upwardly and downwardly projecting spring members 45 which engage with the grooves 38 to lock the columns in place transversely of the longitudinal axis of the tension-web beam being formed.

The various beam elements are either pre-machined or of spot-welded construction so that only assembly guides are needed in the un-reeling system. The top plate or strip 36 could be single rather than laminated as shown which enables each of the two laminae to be separately coiled in storage so as to enable the use of smaller diameter reels.

As disclosed in FIGURE 1, the edges of each of the strips which form the plates 36 and 37 and the side tension webs 40 and 42 are provided with identical, tapered tongues 46 and slots 47 which interfit as the four strips are unwound from their coils to form a rigidly connected box structure in cross-section.

As the side tension-web members 40 and 42 unwind from their reels 41, the hinged half column members 43 swing toward each other into edge abutting relationship. Simultaneously therewith, the top plate strip 36 is guided downwardly and the bottom plate strip 37 is guided upwardly from their storage rolls by guide rolls (not shown for the sake of clarity of FIGURE 1) into interlocking edge-to-edge engagement and connection with the edges of the side tension-webs 40 and 42.

The guide grooves or slots 38, being in longitudinal alignment with the locking spring members 45, move into co-operating relationship therewith to restrain the plate support column halves 43 in edge abutting, transversely disposed position. It is to be noted that the interlock tongues and slots 46 and 47 which transfer shear stresses, permit tension-web load to be transferred to each of the laminae of the plate 36.

Dissembly of the tension-web beam 35 is readily effected by rewinding the strips 36, 37, 40 and 42 upon their respective reels. In actual practice, the beam is never completely rewound so as to leave the outermost portions connected, to facilitate the extension of the beam during its next use.

The use of a single extensible strip 48 to form a portable extensible boom generally designated as 50 is disclosed in FIGURES 2–6 inclusive and is utilized as a manipulator extensible up to 20 feet, by the addition of a tool holding terminal hook 52 to the outer end of the strip 48. The strip 48 is coiled in flat position on a reel 53 in the base 51 of the boom 50 and a battery pack 54 is mounted in the core of the reel to furnish the required electric power for the extension and retraction of the boom.

FIGURE 6 illustrates at A the flat position of the strip 48 when coiled on the reel 53, the natural unstressed position at B, and the rolled or edge connected position to form a boom at C. Such connected position is retained to form a rigid extended boom by means of a zipper closure 55 which may be the toothed, continuous lip, or other type of closure or connector. The circular neck 56 (FIGURE 4) of the boom housing base 51 shapes the strip 48 as it leaves the reel 53 from its flat condition into the circular, rigid connected boom 50.

A simple push-pull cable 57 is extensible from a reel 58 simultaneously with the boom 50, both being extended or retracted by a reversible motor 60 through driving means (not shown but the strip edge connecting means serves as a rack in most cases as will be described), and the cable being operably connected to an actuating lever 62 of the terminal hook 52. The portable boom 50 is provided with a supporting handle 63 which includes a hook control trigger 64 and a motor operating switch 65.

The single strip 48 forming the extensible boom 50 can be fabricated of either metal, spring material or plastic. In the later case, the boom would, of course, comprise an insulated structure. It will be appreciated that the novel portable boom described has many applications such as a manipulator for the remote handling of dangerous materials, as a naval boat hook, as a tool for telephone repair men, as an aid to negotiating difficult terrain by special service forces, etc.

As indicated above, various methods of connecting the co-operating engaging edges of the stored extensible strips forming the rigid extensible booms, beams, etc. upon their extension may be utilized and FIGURES 7 to 13 inclusive disclose the use of a wire or cable 67 for such purpose. As shown, the boom is formed of three or more strips 68 each having co-operable, alternate slots 70 and flexible rolled arcuate fingers or arcuate hook portions 72 formed in their side edges.

FIGURES 8 to 13 show the successive steps involved during retraction of the boom, etc. formed by the strips 68, in the removal of the wire 67 from the flexible fingers 72 to disconnect the strips 68 for return to storage. FIGURE 8 shows the rigid extended boom position of the connectors 67, 70, 72; in FIGURE 9, the strips are being compressed by guide rollers (not shown) so as to provide enough play between the opposed flexible fingers 72 to permit the start of outward withdrawal of the wire 67 therefrom; FIGURE 10 shows the complete withdrawal of the wire; and FIGURES 11 to 13 illustrate the movement of the beam forming strips away from each other under the influence of guiding rolls (not shown) and back to the storage coils.

FIGURES 14 and 15 and 15A disclose an alternate but generally similar method of connecting the strip edges as that of FIGURES 7–13 and employs an articulated bead chain 74 provided with a plurality of regularly spaced beads 75. The edges of the strips 78 to be connected to form a rigid boom, beam, etc. are provided with specially formed, spaced, interfitting, flexible connectors 76 each having two arcuate bead seats 77. As indicated in the drawing figures, the chain 74 and beads 75 are inserted between the connectors 76 in a slack chain condition after which the chain is pulled tight to seat the beads 75 against their seats 77 to lock the strips together to form a rigid extended boom.

FIGURES 16 to 31 disclose various optimum forms of means for connecting the edges of a single strip extensible boom such as is disclosed in FIGURES 2–6 inclusive. One of such forms is disclosed in FIGURES 16 to 19 wherein the abutting edges 80 of the strip 82 are each provided with longitudinally spaced slots 83 adapted to be engaged by the links of a special chain 85 driven by a sprocket 84 to connect the edges and to extend or retract the single strip boom 82.

The chain 85 is formed of pin connected links embodying alternately a back stop projecting portion 86 and a hook 87 which project into the slots 83 to hold the edges together and to effect the extension or retraction of the boom and to prevent axial clearance and possible relative shifting of the strip edges 80. The close lateral fit of the chain link members is intended to minimize side shift of the plate edges. It is to be noted that in this as well as in the following embodiments, the strip edge connecting chain 85 may be employed as a rack for the purpose of applying forces to effect the extenison and retraction of the boom forming strip 82. Reverse drive of the sprocket 84, of course, retracts the boom and effects separation of the edges of the strip 82 to enable it to return to the flat, coiled, storage position.

The chain and slots disclosed in FIGURES 16–19 are particularly suited for use with the abutting edges 80 by virtue of the nature of the engagement of the back stop link 86 with the strip 82. The heel of the back stop follows and arcuate path during engagement with the strip and consequently tends to bear against the upper edge of the slot 83, because the center of rotation of the link lies above the upper surface of the plate. If this configuration were employed with a lap joint, it would be necessary to have unequal openings in the edges 80 such that the upper course of each would bear on the heel of the back stop link to avoid any possibility of relative axial movement.

The percentage of strip opening axial length with respect to twice the chain pitch is a direct function of total plate thickness and an inverse function of engagement sprocket pitch diameter. All of the examples illustrated in FIGURES 16 to 31 are based on 1.0" pitch chain, ¼" strip thickness and 8-tooth (2.613" P.O.) engagement sprocket. On this basis for example, FIGURE 16 shows a 37.5% slot opening.

The disclosure of FIGURES 20 to 24 is very similar to that of FIGURES 16 to 19 and similar parts bear similar numerals. As disclosed, the back stop link 86 and hook link 87 are employed with a connecting side link 88 so that the back stop link is constrained to enter and leave the strip slot 83 in a normal direction. This allows full area bearing between the strip and the heel of the back stop link, as contrasted with the edge bearing of FIGURES 20 and 21.

The disclosure of FIGURES 25 to 29 is very similar to that of FIGURES 20 to 24 as applied to a lap joint consisting of two layers formed by the edges of a ¼ inch thick extensible strip 90, having laterally and longitudinally spaced slots 92 and again similar numerals designate similar parts. The back stop link 86 has a parallel motion and the advantage thereof as compared with the arcuate motion of the back stop link shown in FIGURES 16 and 17 is evident. It will be noted as a result of the increased total strip thickness that the strip slot openings are increased to 50%.

FIGURES 30 and 32 disclose a lap joint and chain links similar to FIGURES 25 to 29. However, while the percentage of strip slot or opening is the same, the width of the opening, the width of the chain, and the necessary strip edge overlap have all been considerably reduced by providing a sprocket 94 having engagement outside of the chain 85 instead of inside of it.

While the connectors illustrated in FIGURES 16 to 31 are intended primarily for application to the extensible boom system, it will be apparent that they may be employed on other types of structures to advantage such as temporary or portable field-erected structures and those which must be assembled automatically or by remote handling equipment.

It is to be understood that the forms of our invention herewith shown and described are to be taken as preferred examples of the same and that various changes in the shape, size and arrangement of parts may be resorted to without departure from the spirit of the invention or the scope of the subjoined claims.

We claim:
1. An extensible tension-web beam comprising a plurality of separately stored strips extensible into edge-to-edge interlocking engagement to define top and bottom plates and side tension webs, and panels hinged at spaced points to at least one of said strips to define transverse beam reinforcing columns.

2. The combination recited in claim 1 wherein said extensible strips are retractable back to storage position.

3. The combination recited in claim 1 wherein tapered tongues and slots are formed in the edges of said strips to enable said interlocking engagement to form a rigid structure.

4. The combination recited in claim 1 wherein the defined plates include locking grooves and said columns include spring members engageable therewith to lock said columns in transverse position.

5. The combination recited in claim 1 wherein at least one of said defined plates is formed of strip laminae.

6. An extensible manipulator comprising, in combination, a portable housing including a handle and containing a member extensible therefrom to form a rigid hollow boom, a pair of clamping hooks mounted on the end of said boom, and extensible hook operating means connecting said hooks and said handle.

7. The combination recited in claim 6, and power means mounted in said housing for effecting extension of said boom-forming member.

8. The combination recited in claim 6 wherein said member comprises a flat rectangular strip shapeable into a tube as it is extended out of said housing.

9. The combination recited in claim 8, and power means mounted in said housing and engageable with said strip to effect extension thereof and formation of said boom.

10. The combination recited in claim 8 wherein the edges of said strip are slotted, and retaining means engaging said slots for rigidly connecting the edges of said strip.

11. The combination recited in claim 10 wherein said retaining means comprises a plurality of chain links.

References Cited by the Examiner
UNITED STATES PATENTS

| 2,799,368 | 7/1957 | Alter | 52—108 |
| 2,905,282 | 9/1959 | Miller | 52—108 |
| 3,016,988 | 1/1962 | Browning | 52—108 X |

GERALD M. FORLENZA, *Primary Examiner.*

G. F. ABRAHAM, *Assistant Examiner.*